UNITED STATES PATENT OFFICE.

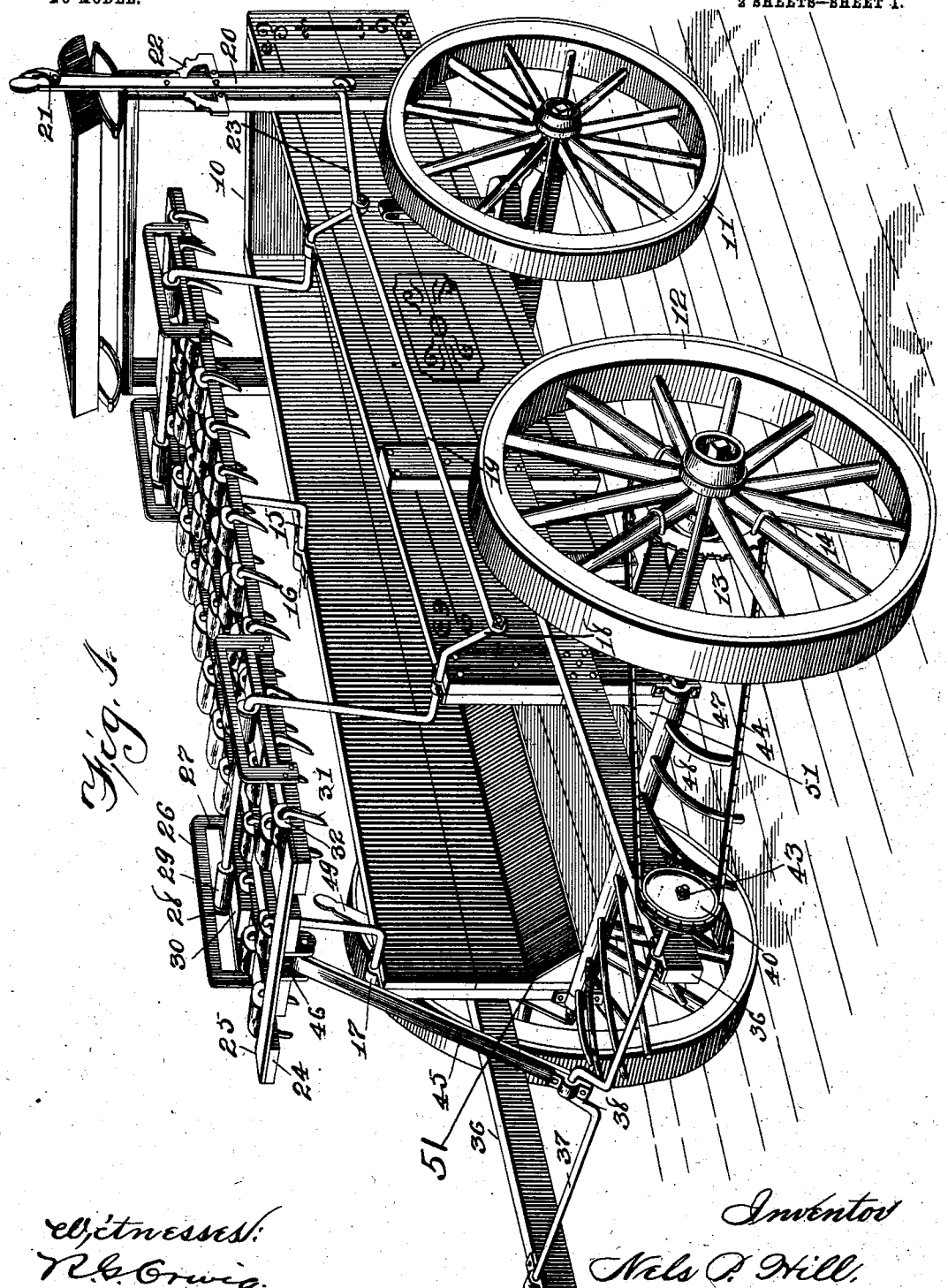

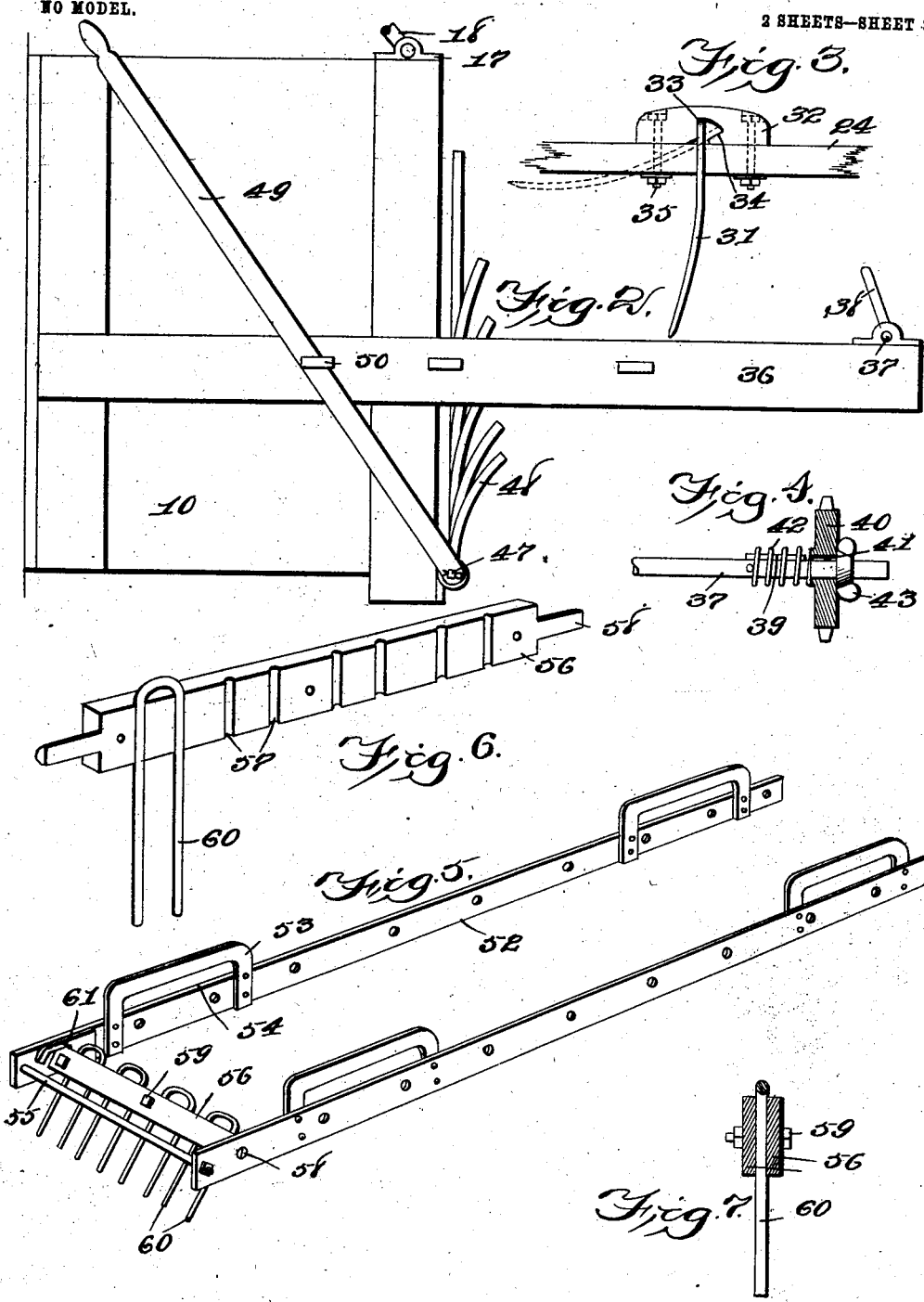

NELS P. HILL, OF EAGLEGROVE, IOWA.

MANURE-SPREADER.

SPECIFICATION forming part of Letters Patent No. 721,189, dated February 24, 1903.

Application filed May 17, 1902. Serial No. 107,883. (No model.)

*To all whom it may concern:*

Be it known that I, NELS P. HILL, a citizen of the United States, residing at Eaglegrove, in the county of Wright and State of Iowa, have invented certain new and useful Improvements in Manure-Spreaders, of which the following is a specification.

The object of my invention is to provide a device of simple, durable, and inexpensive construction which may be applied to a wagon-box and that may be readily, quickly, and easily adjusted to position, so that the wagon-box may be easily and quickly filled with manure, and after being filled the wagon may be driven a considerable distance and its contents firmly retained in place. Then when it is desired to spread the manure on the field the operative mechanism is connected with the traction-wheels and the manure is separated into small particles and raked or scraped off of the top of the wagon-load and spread upon the field automatically. As fast as the load is distributed the raking or scraping device may be manually lowered to engage the top of the load, and, furthermore, the combined spreader and end-gate at the rear of the wagon-bed may be lowered to permit the load to be scraped or raked off in an even uniform manner. Hence every particle of the contents of the wagon may be finely separated and discharged from the wagon in an even and uniform manner without the necessity of manually moving any part of the load.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows in perspective the entire device applied to a wagon and in position ready to receive a load. Fig. 2 shows a rear elevation of one side of the wagon-box to illustrate the means for adjusting the combined scraper and end-gate. Fig. 3 shows an enlarged detail view of one of the scraping or raking teeth and connected parts. The position that the tooth assumes on its return movement is illustrated by dotted lines. Fig. 4 shows a detail view illustrating the device for throwing the driving-gear in and out of engagement with the rear axle. Fig. 5 shows a perspective view of a modified form of the raking or scraping device. Fig. 6 shows an enlarged detail perspective view of one portion of the tooth-holding bars for use in connection with the modified form shown in Fig. 5, one of the teeth being shown in position therein. Fig. 7 shows a transverse sectional view, on an enlarged scale, through one of the cross-bars of the said modified form.

Referring to the accompanying drawings, I have used the reference-numeral 10 to indicate the wagon-box, which is mounted upon the usual running-gears (indicated by the numeral 11) and of which 12 indicates one of the rear or traction wheels thereof. This wheel is provided with a sprocket-rim 13, connected therewith by the clamps 14, and from this sprocket-rim the operative parts of the machine are driven.

Mounted upon the top edges of the wagon-box are two crank-shafts 15, one being mounted in the bearing-boxes 16 near the front of the wagon-box and the other being mounted in the bearing-boxes 17 in the rear end of the wagon-box. Each crank-shaft is provided with a long crank at its central portion, and on one end of each crank-shaft is a crank-arm 18. These crank-arms 18 are connected by means of a rod 19, and mounted adjacent to the driver's seat is a lever 20, having a spring-actuated pawl to engage a stationary segmental rack 22, and the lower end of the said lever 20 is connected with the forward crank-arm 18 by means of a rod 23. By this means it is obvious that when the lever 20 is manipulated the long crank-arms of the crank-shafts 15 will be moved simultaneously, and obviously they may turn from a position almost vertically above the wagon to a position where they will stand close to the bottom of the wagon, and they may be securely supported or locked when in any position throughout their limit of movement. The scraping or raking device, to be hereinafter described, is supported upon these crank-arms, and obviously by manipulating the lever 20 the raking or scraping device may be made to engage the top of the load at all times.

The raking or scraping device proper comprises a series of longitudinal wooden bars 24, connected at their ends by the cross-strip 25.

Attached to the sides of the outer bars 24 are the metal guides 26, each longitudinally slotted at 27. The said crank-arms of the crankshafts 15 pass through the slots 27, and washers 28 prevent lateral movements of the guides 26 on the crank-arms, and the rollers 29 on the said crank-arms pass through the slots, and thus minimizing the friction. I preferably place on the bars 24, adjacent to the slots 27, the blocks 30, having smooth flat tops, upon which the said rollers 29 may travel. By this means it is obvious that the raking or scraping frame may be moved longitudinally when at any limit of its vertical movement. The bars 24 of the raking or scraping device are each provided at regular intervals throughout their length with raking or scraping teeth 31. These teeth are substantially U shape, the ends being pointed. Each tooth is made to straddle the bar, and on top of the bar is a metal block 32, having a transverse opening to receive the tooth, said opening having square shoulders at 33 and 34 to limit the rocking movement of the teeth therein. Said blocks are permanently secured to the bars 24 by means of the bolts 35. The limit of the rocking movement of the teeth is indicated in Fig. 3, the solid lines in said figure showing the position of the teeth when moving rearwardly, and the dotted lines indicate the position when moving forwardly. Hence obviously the teeth will tend to move the manure rearwardly, but not forwardly.

At the rear end of the wagon-box are two arms 36 to project rearwardly. Mounted upon said arms is a crank-shaft 37, having at its central portion a crank-arm 38. On one end of the crank-shaft 37 is a key 39, (see Fig. 4,) and a sprocket-wheel 40, having a key-seat 41 to receive the key 39, is slidingly mounted upon the shaft. An extensile coil-spring 42 is mounted on the shaft to normally hold it away from the key 39, and on the other side of the sprocket-wheel a nut 43 is mounted to engage the sprocket-wheel. Obviously by manipulation of the nut the sprocket-wheel may move against the pressure of the spring 42, so that the key 39 enters the key-seat of the sprocket-wheel. Then the sprocket-wheel and shaft 37 will be rotated in unison, and when the nut 43 is unscrewed the spring will hold the sprocket-wheel out of engagement with the key, and the sprocket-wheel may freely rotate on the shaft. This sprocket-wheel 40 is connected with the sprocket-rim 13 by means of the sprocket-chain 44. A pitman 45 is connected with the crank-arm 38 and pivoted to the bracket 46 at the rear of the raking or scraping frame. Hence obviously when the wagon is advanced over the ground-surface and the sprocket-wheel 43 is connected with its shaft to rotate in unison the raking or scraping frame will be reciprocated. I have also provided a combined end-gate and scraper. The numeral 47 indicates a shaft mounted in the rear end of the wagon at or below the bottom of the wagon, and fixed to the said shaft is a series of bars 48, the outer ones of which incline downwardly and outwardly. Fixed to one end of the shaft 47 is a lever 49 and fixed to one of the bars 36 is a series of hooks 50, arranged to be capable of engaging the lever 49. Referring to Fig. 2 of the drawings, it will be seen that when the lever 49 is in engagement with the first hook 50 the bars 48 will be in a substantially vertical position and they will serve the function of an end-gate for the wagon, and when the lever 49 is in the last hook the bars 48 will assume a position substantially horizontal and they will act as a spreader.

On the inside of the wagon-body and fixed to the bottom and near the sides of the wagon-body I have provided the longitudinal strips or plates 51 to prevent the contents of the wagon-body from lodging near the lower portions of the sides of the wagon-bottom.

In practical use and assuming the wagon to be empty the operator manipulates the lever 20 so as to elevate the raking or scraping frame to its upper limit of movement, as shown in Fig. 1. Obviously when in this position the wagon may be readily loaded. The end-gate and spreader are then placed in a substantially vertical position, and the wagon may then be transported to a field. When it is desired to start the operation of the machine, the sprocket-wheel 40 is connected with its shaft to rotate in unison therewith, and obviously as the machine is advanced the raking or scraping frame will be reciprocated, and the teeth thereof will tend to separate the manure and advance it step by step toward the rear end of the wagon. The spreader serves to distribute the same equally over the ground-surface. As the manure is scraped off of the wagon the operator lowers the raking or scraping frame by means of the lever 20, and this obviously can be done while the wagon is still advancing. The spreader at the rear of the wagon is adjusted from time to time as required. If at any time it is desired to stop the operations of the machine and yet permit the wagon to advance, the sprocket-wheel 40 is simply thrown out of gear. Obviously the raking or scraping frame may be lowered bodily until its teeth engage the rim of the wagon-box, and hence every particle of the contents of the wagon may be removed without being handled by the operator.

I have provided a modified form of raking or scraping frame made completely of metal, Fig. 5. This modified form of construction comprises two parallel side bars 52, having the arms 53 attached thereto, forming between the lower edges of the arms 53 and the top edges of the bars 52 the slots 54. These side bars 52 are connected at their ends by the cross-bar 55. At regular intervals throughout the length of the bars 52 I have provided teeth-holding bars. These teeth-holding bars comprise two main flat pieces 56, having vertical grooves 57 on one face and having semicylindrical journals 58 at their ends. Obviously when two of these parts are placed together and connected by means of bolts 59 the U-shaped teeth 60 may be passed through the grooves 57 between the pieces 56 and firmly held in position by means of the bolts. Obviously they can be adjusted therein, and hence may be made to project any desirable distance beneath the said pieces 56. The journals at the ends are passed through suitable openings in the bars 52. This rotary movement of the said parts, however, is limited by means of a plate 61, fixed to the under surface of one of the side pieces 52 and having shoulders to engage the face of the parts 56, and thus limit their movement to positions substantially corresponding with the limits of movement of the teeth 31, as indicated in Fig. 3.

Having thus described my invention, what I claim, and desire to secure by Letters Patent of the United States therefor, is—

1. In a manure-spreader the combination with a wagon, of a raking-frame having downwardly-projecting teeth, and means for supporting said frame in a substantially horizontal position above the bottom of the wagon-box and for bodily adjusting it vertically relative to the wagon-box, and means actuated by the advance of the wagon for reciprocating said raking-frame when at any point throughout the limit of its movement.

2. In a manure-spreader the combination with a wagon, of a raking-frame, and a number of downwardly-projecting teeth on said frame capable of a limited rocking movement, and means for supporting said frame in a substantially horizontal position above the bottom of the wagon-box and for bodily adjusting it vertically relative to the wagon-box, and means actuated by the advance of the wagon for reciprocating said raking-frame when at any point throughout the limit of its movement.

3. In a manure-spreader the combination with a wagon of crank-shafts mounted in the wagon, means for connecting these crank-shafts to turn in unison, means for moving said crank-shafts jointly, a raking-frame having downwardly-projecting teeth supported in a substantially horizontal position upon said crank-shafts, and means for reciprocating said raking-frame, said means actuated by the advance of the wagon.

4. In a manure-spreader the combination of a wagon, strips above the bottom and adjacent to the sides of the wagon-bed and on the interior thereof, crank-shafts mounted on top of the wagon-bed and having long crank-arms at their central portion and short crank-arms at one end, a link connecting the short crank-arms, a lever connected with one of the said short crank-arms, rollers mounted on the said long crank-arms, a raking-frame, slotted brackets thereon to receive the rollers of the said crank-arms whereby the frame may be supported on the crank-arms and capable of longitudinal movement relative thereto in a horizontal plane, a number of raking-teeth projecting downwardly and rearwardly from said frame, a shaft supported in the rear of the wagon and having a crank-arm, a pitman connecting the said crank-arm with the raking-frame, a gearing device for supporting said shaft upon the advance of the wagon.

5. In a manure-spreader the combination of a wagon, strips above the bottom and adjacent to the sides of the wagon-bed and on the interior thereof, crank-shafts mounted on top of the wagon-bed and having long crank-arms at their central portion and short crank-arms at one end, a link connecting the short crank-arms, a lever connected with one of the said short crank-arms, rollers mounted on the said long crank-arms, a raking-frame, slotted brackets thereon to receive the rollers of the said crank-arms whereby the frame may be supported on the crank-arms and capable of longitudinal movement relative thereto in a horizontal plane, a number of raking-teeth projecting downwardly and rearwardly from said frame, a shaft supported in the rear of the wagon and having a crank-arm, a pitman connecting the said crank-arm with the raking-frame, a gearing device for rotating said shaft upon the advance of the wagon, a shaft mounted at the rear of the wagon-bed near the bottom thereof, a series of rods connected with said crank-shafts, the outer ones of said rods being curved downwardly and outwardly, and means for rocking the said shaft and for supporting it in different positions.

6. In a machine of the class described the combination of a raking-frame having longitudinal bars, blocks attached to each bar and having a transverse central opening provided with flat shoulders, and a substantially U-shaped tooth for each block passed through said opening and assuming a position astride of the bar and designed to engage the said flat surface of the opening when at the opposite limit of its rocking movement, substantially as and for the purposes stated.

7. In a device of the class described the combination of a wagon-box, a shaft rockingly mounted at the rear end of the bottom of the wagon-box, a number of arms fixed to said shaft, the outer ones of said arms inclining outwardly and downwardly, and a lever attached to said shaft whereby it may be rocked, and means for securing the said lever in different positions, for the purposes stated.

NELS P. HILL.

Witnesses:
A. N. ODENHEIMER,
GEO. WRIGHT.